United States Patent [19]
Schmidt

[11] Patent Number: 5,094,650
[45] Date of Patent: Mar. 10, 1992

[54] SLICING MACHINE FOR MEAT AND FISH

[75] Inventor: Hans J. Schmidt, Bersenbrück, Fed. Rep. of Germany

[73] Assignee: GEBA-Geratebau GmbH, Bersenbruck, Fed. Rep. of Germany

[21] Appl. No.: 666,730

[22] Filed: Mar. 8, 1991

[30] Foreign Application Priority Data

Mar. 9, 1990 [DE] Fed. Rep. of Germany ....... 4007503

[51] Int. Cl.⁵ .............................................. A23B 4/03
[52] U.S. Cl. .................................... 452/161; 452/177; 452/166
[58] Field of Search ............... 452/161, 160, 162, 163, 452/166, 177

[56] References Cited

U.S. PATENT DOCUMENTS 2,822,569  2/1958  Gradoff et al. ..................... 452/161

Primary Examiner—Bruce M. Kisliuk
Assistant Examiner—Lawrence Cruz
Attorney, Agent, or Firm—Collard, Roe & Galgano

[57] ABSTRACT

A slicing machine for slicing pieces of meat or fish, especially sides of lox, which has a cutting station and a transport device which guides the material to be cut through the cutting station. The transport device includes movable track segments and fixed track segments. The movable track segments are formed as carriers for the material to be cut, which can be moved in increments, relative to the fixed track segments, by means of a drive device. The drive device includes vertical drive elements and horizontal drive elements. Each track segment is a strip that extends across the length of the track element.

13 Claims, 3 Drawing Sheets

SLICING MACHINE FOR MEAT AND FISH

BACKGROUND OF THE INVENTION

The invention relates to an apparatus for slicing material, preferably pieces of meat or fish, especially sides of lox. More particularly, it relates to such a device having a cutting station and a transport device which guides the material to be cut through the cutting station.

In order to obtain slices with a large area, sides of lox are cut at an angle into slices that are approximately paper-thin. The cut lox is packaged and sold in ready-to-serve form. Factory processing, especially of sides of lox, requires devices that are capable of cutting large amounts of lox into thin slices.

There are devices known which work with rotating blades and have the advantage that the thickness of the individual slices can be adjusted. But the delicate and sensitive meat of salmon requires that it be cut in a slightly frozen state, due to the pulling action of the rotating blades. This requires that the meat be frozen and refrozen several times, which is known to damage the meat, during factory processing. By freezing the material to be cut, relatively large ice crystals are produced which can destroy the protein. The material to be cut, whether fish or meat, becomes mushy and requires layers of paper to be placed between the individual slices, so that the slices do not stick together.

Another device is known, with which the meat or fish, especially sides of lox, can also be cut in the fresh, non-frozen state. The known device works with a cutting grid consisting of knife blades arranged parallel to one another, which stands at a slant in order to cut the material at an angle. The cutting grid is moved up and down to produce the cutting ation. A side of lox is passed through the moving cutting grid and cut into individual slices. The known device does have the advantage that non-frozen material can be sliced. But it is disadvantageous in that the thickness of the slices cannot be adjusted. This is because the distance between the individual, parallel knife blades of the cutting grid is preset. The cutting angle and the cutting thickness are therefore not adjustable. It is also disadvantageous that when the cutting grid is moved up and down, the closely adjacent knife blades cause smearing and adhesion effects. In addition, it is difficult to maneuver the cut slices onto a plate necessary for shipment and packaging. Such actions are particularly needed when salmon or similar goods are processed on a factory scale, since the thin slices are difficult to handle.

SUMMARY OF THE INVENTION

It is, therefore, an object of the present invention to eliminate the afore-mentioned drawbacks of the prior art and to provide an apparatus with which sides of lox, in particular, can be cut at any thickness in the soft, non-frozen state.

These and other related objects are attained according to the invention by a transport device including a track element. The support surface for the material to be cut is formed of adjacent fixed track segments. A pre-determined number of moveable track segments are formed as carriers for the material to be cut. The movable track segments are moved increments by drive means relative to the adjacent fixed track segments.

The carriers pass the material to be cut through the cutting station in increments. By simply changing the size of the increments, the cutting thickness of the device can be changed. Between each individual incremental movement, a slice can be cut by the cutting station.

Dividing the support surface of the track element of the transport device into fixed and movable track segments has the advantage that the movable track segments can be moved by the drive device similar to a so-called "pilgrim's step." A drive device is provided that includes elements for vertical drive and for horizontal drive of the movable track segments. The movable track segments can be lifted by the vertical drive in such a way that the material to be cut rests on them. Using the horizontal drive, the movable track segment, together with the material to be cut which rests on it, is moved in the direction of the cutting station. The horizontal drive is set in such a way that the movement takes place horizontally as one increment, in a pre-determined and set manner. The vertical drive then acts in reverse and lowers the movable track segments, so that now the material to be cut is resting on the fixed track segments ready to be cut.

At the same time, but more practically immediately afterward, the movable track segments are moved back, in the lowered position, by the same increment. Thereafter, the movable track segments are lifted again in order to move the material forward another increment. Another cut can then be made. With a multiple, rapid sequence of incremental movements and cuts, a side of lox is completely cut into slices of the desired thickness.

The "pilgrim's step movement" of the movable track segments can be achieved, by a relatively simple design, with work cylinders which serve as elements for the drive means. Only a few drive cylinders are needed for a drive device, if, for instance, several movable track segments are coupled with one another by connecting bridge links. The working cylinders can then engage the bridge links. End stops which limit the displacement path of the work cylinders can be provided and are ideally suited for the work cylinders which operate as the horizontal drive. End stops can project out to adjust the increment size. The distance between the stops can be changed to adjust the cutting thickness.

It is particularly desirable if each track segment is a strip that extends across the length of the track segment. Movable strips and fixed strips are arranged alternately, parallel to one another, advantageously acting as guides for each other. The transport device can be given dimensions which make it possible to arrange several sides of lox, for example, not only next to one another but also behind one another. The sides of lox can be passed continuously through the cutting station. Sides of lox lying next to one another on the support surface can then be ideally cut simultaneously, with a cut taking place after every increment. The use of strips for the track segments has an advantage, especially for the movable track segments, in that the structural expenditure of the drive devices of the strips and their guidance can be reduced to a minimum.

It is desirable that the movable track segments carry the material with as little slip as possible because the thickness of the slices depends on the incremental movement of the movable track segments. The tops of the movable track segments which lie approximately in the plane of the support surface are, therefore, equipped with projecting carriers. Preferably, needles are used as carriers which stick into the material from below, and do not leave any needle holes in the material due to their small dimensions.

The cutting station comprises a cutting knife which extends laterally across the track element. It can be moved along a guide directed against the support surface for the material. The cutting knife of the cutting station can be moved up and down, along the guides, in cycles, by means of a suitable drive. It is practical if the guides are arranged on both sides of the track element supporting the cutting knife, which extends from guide to guide, like a bridge over the transport element. During every downward movement towards the support surface, the cutting knife makes a cut across the entire width of the track element.

In order for the cutting knife to be able to cut the material completely during its downward movement along the guides, the support surface of the track element for the material has a recessed lateral groove running through all the track segments in the area of the guide. The cutting knife can go down into this lateral groove when it is moved into its lowest position at the bottom end of the guides.

To facilitate cutting, especially in the case of sensitive material, such as sides of lox, the cutting knife can be equipped with two oscillating knife blades which rest against one another. The cutting edges of the knife blades are preferably serrated. Drives which move the cutting knives in oscillation can be attached at one end of the cutting knives and form a drive head. The drive head can be moved back and forth along the guides together with the cutting knives. Work cylinders can be provided for movement of the drive head with the cutting knife along the guide.

Ideally, the guides are inclined at a pre-determined angle towards the track element which determines the cutting angle. It is possible to adjust the incline angle of the guides relative to the track element accordingly, in order to change the cutting angle. A preferred embodiment of the apparatus provides that it has a device to adjust the gradient or incline of the track element relative to the horizontal. With this, the cutting angle can be adjusted by changing the gradient of the entire track element, while the direction of the guides remains unchanged. Preferably, the track element provides transport through the cutting station at a slightly downward angle, with the guides also being inclined downwards in the direction in which the material to be cut is transported through the cutting station.

In order to achieve consistent cutting results, even at different cutting angles, the apparatus is advantageously designed so that the axis around which the track element can be pivoted to adjust its gradient or incline lies in the same line as the knife blade in its lowest position relative to the track element. By providing corresponding pivot points and fasteners for the track element on the apparatus, the track element can be pivoted around this axis, in order to change the cutting angle.

The combination of cutting angle adjustment and adjustment of the increment size makes it possible to cut slices with any thickness and at any angle. A particular benefit is that this can be done with non-frozen meat or fish. When slicing sides of lox, it is no longer necessary to place paper between the slices, which can be easily deposited on plates, trays, or similar items, at the end of the transport device. In this manner, the material can be passed on to further processing.

Of course it is also possible to use the apparatus according to the invention to cut fillets of other types of fish, or also poultry, game, etc.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawing, wherein similar reference characters denote similar elements throughout the several views.

DETAILED DESCRIPTION OF THE PREFERRED EMBODIMENT

Figure 1:
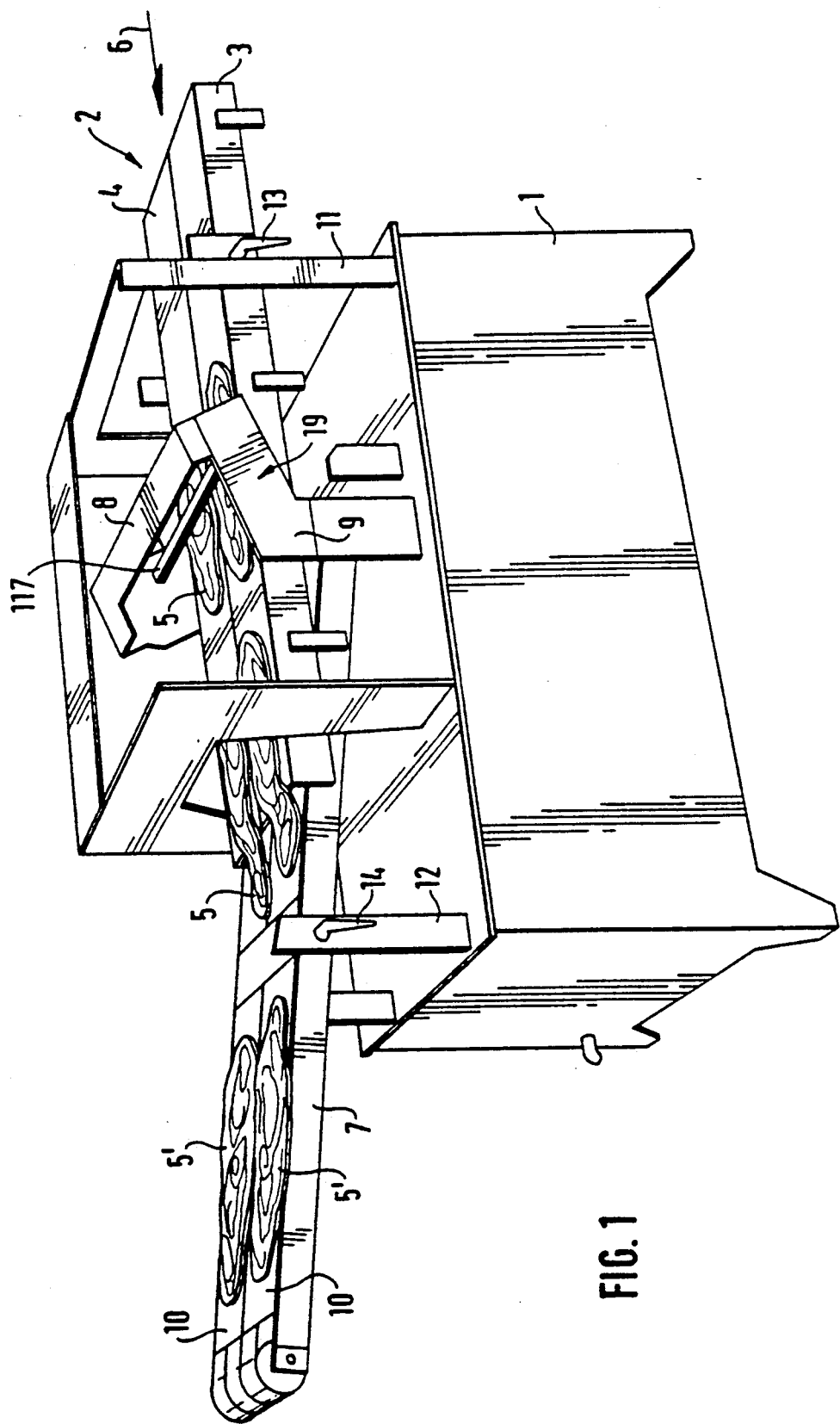
FIG. 1 is a front elevational view of the slicing machine embodying the present invention.

Referring now to the drawings in detail, and particularly to FIG. 1, there is seen a slicing machine with a box-shaped basic frame 1 and a transport device 2 which comprises a track element 3 embodying the present invention. The top of track element 3 serves as a support surface 4 for the material. The material to be cut can be laid onto the part of transport device 2 which projects beyond frame 1. The transport device conveys the material, here indicated as being sides of lox 5, in the direction of the arrow 6, to a conveyor belt 7 which transports them off.

A bridge beam 8 of a cutting station 19 holds a cutting knife 117 which extends laterally across track element 3 of transport device 2. Bridge beam 8, which holds cutting knives 117, can be moved back and forth along guides 9 which are arranged on both sides of the track element. The guides, as shown, are inclined downward, so that bridge beam 8 guides cutting knives 117 held in it against support surface 4. Cutting knives 117 cut the material (side of lox 5) into a slice with two consecutive cuts. The cutting thickness between the individual cuts is determined by an incremental movement through cutting station 19 in the direction of arrow 6. With a corresponding repetition of the transport increments an cutting movements, the material is cut into slices, one after the other, in rapid sequence. At the end of transport track 2, conveyor belt 7 is provided with plates 10. Sides of lox 5 are deposited on plates 10 and conveyed off in the direction of arrow 6. At the end of conveyor belt 7, two sliced sides of lox 5' are each located on plates 10. Conveyor belt 7 can be formed as a simple belt conveyor, the transport speed of which is adapted to the incoming speed of transport device 2.

At supports 11 and 12, which rise up from frame 1, adjustment devices 13 and 14 are provided with which the gradient of track element 3 as well as that of conveyor belt 7 can be adjusted. By changing the gradient of track element 3, the cutting angle can be influenced.

Figure 2:
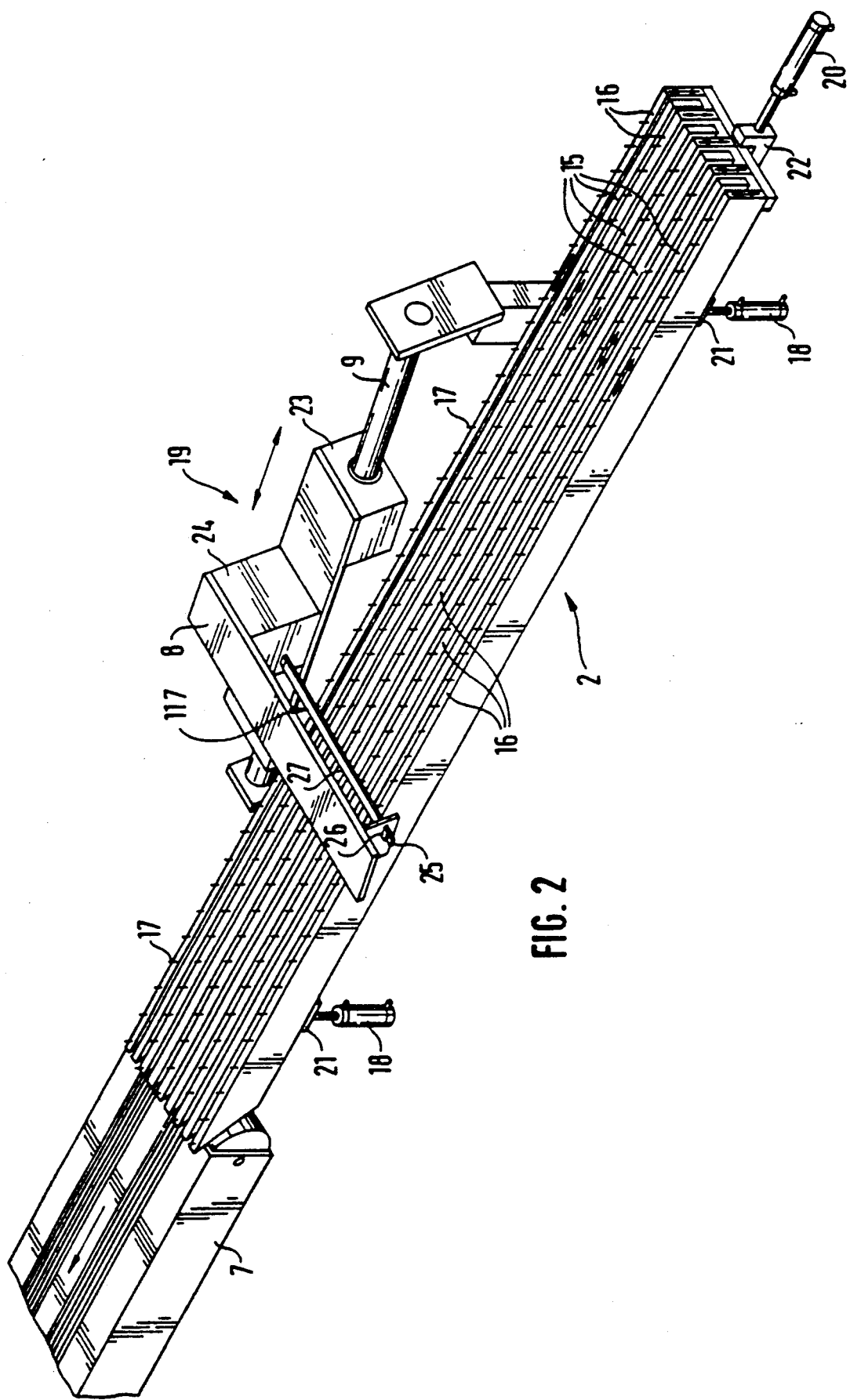
FIG. 2 is a perspective view of the transport device and the cutting station.

FIG. 2 shows a schematic view of transport device 2 of the apparatus, as well as cutting station 19. Transport device 2 comprises the track element 3, which, as shown, consists of fixed track segments 15 and movable track segments 16. Each track segment 15, 16 is, as shown here, a strip which extends over the entire length of the track element of transport device 2. The tops of movable track segments 16 which define the support surface for material to be cut are equipped with projecting needles 17, which serve as carriers for the material.

As drive devices for movable track segments 16, elements for vertical drive 18 are provided, as well as an element for horizontal drive 20. Elements 18 and 20 are, as shown here, work cylinders. Movable track segments 16 are all connected with one another by means of lower cross-beams 21, so that vertical drive elements 18 engage with these connectors and therefore only a few work cylinders are necessary in order to be able to move all movable track segments 16 up and down simultaneously.

The element for horizontal drive 20 is also a work cylinder which, as shown, engages with a fork 22, in the fork mouth of which cross-beam 21 is again guided to move up and down. Horizontal drive element 20 can move movable track segments 16 back and forth together. With appropriate control of the vertical drive elements and the horizontal drive element, movable track segments 16 can be moved similar to a so-called "pilgrim's step." If there is material to be cut resting on the top of the transport device, movable track segments 16 can first be lowered down by lowering vertical drive elements 18. This causes the material to be cut to rest only on fixed track segments 15. In this lowered position, movable track segments 16 are retracted by retraction of the piston rod of the work cylinder acting as horizontal drive 20, by a pre-determined increment. Subsequently, vertical drive elements 18 are moved out again so that movable track segments 16 lift up far enough so that they come back into contact with the bottom of the material to be cut. When this happens, needles 17 penetrate into the material to be cut. If the piston rod of the work cylinders which functions as horizontal drive 20 is now moved out a pre-determined and adjustable distance, the movable segments move back into the position in which they are to be lowered again at the end of the movement step. While this occurs, the material is moved along, at the pre-determined increment, and therefore also guided through cutting station 19 in increments.

The cutting station comprises inclined guide 9, which is formed as a round rod here for the sake of simplifying the representation. The guide is set adjacent to the track segments. Along this guide, head 23 slides back and forth, for example, via a work cylinder (not shown for reasons of clarity). The head carries drive element 24, indicated schematically here, as well as bridge beam 8. Bridge beam 8 in turn carries a cutting knife 117 which extends between head 24 and the end of bridge beam 8. Cutting knife 117 consists of two reciprocating knife blades 25 and 26, which rest against one another. The blades operate similar to an electric carving knife. Cutting knife 117 can be moved parallel to guide 9 with their cutting edges 27, and can thereby penetrate into the material to be cut as it is being brought up by transport device 2 in increments. The cutting knife extends laterally across the track segments. The material is cut as soon as the greatest possible approximation of the cutting knives to the support surface of transport device 2 has been reached, i.e. head 24 has moved down as far as possible along guide 9.

Figure 3:
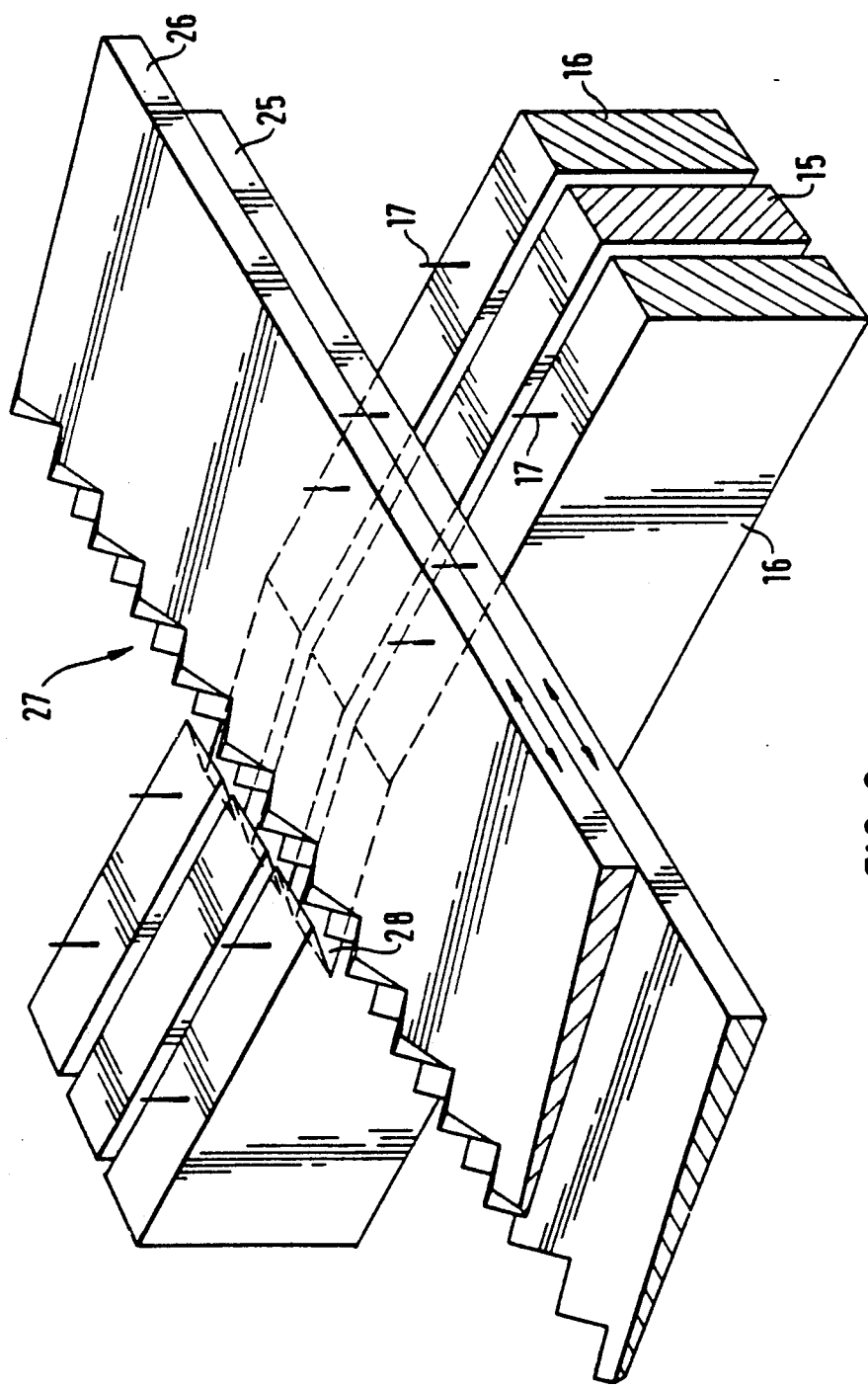
FIG. 3 is an enlarged perspective view in part section of several track segments of the transport device in combination with the cutting knives of the cutting station.

FIG. 3 shows a view of a section of FIG. 2 on an enlarged scale. On both sides of fixed track segment 15, there are two movable track segments 16, which are equipped with projecting needles 17. The knife blades are again designated as 25 and 26. Knife blades 25 and 26 have serrated cutting edges, as shown.

FIG. 3 makes it clear that the support surface for the material has a recessed lateral groove 28 formed in all track segments 15 and 16 in the area determined by the end of the guide. Cutting edges 27 of the knife blades 25, 26 can drop into this lateral groove when they reach the lowest part of the guide, and therefore cut the material completely. As shown, lateral groove 28 is wedge-shaped so that movement into the lateral groove is possible at an angle to the support surface allowing the material to be cut at an angle. As can be seen, the knife travels below the support surface into the groove. The groove is sufficiently deep to facilitate cutting and shallow enough so as to not impede the movement of the material along the transport device.

Accordingly, while only several embodiments of the present invention have been shown and described, it is obvious that many changes and modifications may be made thereunto without departing from the spirit and scope of the invention.

What is claimed is:

1. A slicing machine with a cutting station and a transport means for feeding material to be cut through the cutting station, the transport means comprising:
   a plurality of parallel, spaced apart fixed track segments, defining a support surface for the material to be cut;
   a plurality of parallel, spaced apart movable track segments disposed between said fixed track segments and serving as a material carrier; said fixed and movable track segments being disposed in close proximity to the cutting station; and
   drive means connected to said plurality of movable track segments for incrementally advancing the material through the cutting station, wherein said drive means includes a vertical drive element for retracting said plurality of movable track segments below said support surface, defining a lower position, and returning said plurality of movable track segments to said support surface, defining a raised position.

2. The slicing machine according to claim 1, wherein said movable track segments are arranged alternately with respect to said fixed track segments.

3. The slicing machine according to claim 1, wherein said drive means additionally includes a horizontal drive element for moving said plurality of movable track segments in one direction in said raised position and moving said plurality of movable track segments in the opposite direction in said lower position.

4. The slicing machine according to claim 3, wherein said plurality of fixed segments and movable segments comprise elongated rigid strips that extend the full length of said transport means.

5. The slicing machine according to claim 4, wherein said plurality of movable track segments are equipped with projecting carriers that engage the material when said plurality of movable track segments are in said raised position.

6. The slicing machine according to claim 5, wherein said projecting carriers are needles.

7. The slicing machine according to claim 6, wherein the cutting station comprises a guide member disposed adjacent to said track segments and a cutting knife coupled to said guide member and extending laterally across said track segments, said guide member guiding said knife toward said support surface.

8. The slicing machine according to claim 7, wherein said support surface includes a recessed lateral groove formed in said track segments to permit said knife to travel below said support surface.

9. The slicing machine according to claim 7, wherein said cutting knife comprises two adjacently mounted knife blades; and
   drive means connected to said blades for providing a reciprocating motion to the cutting edges of the blades.

10. The slicing machine according to claim 1, wherein said guide is inclined at a predetermined angle with respect to said track element.

11. The slicing machine according to claim 9, wherein said knife blades have serrated cutting edges.

12. The slicing machine according to claim 8, wherein the slicing machine includes adjustment means connected to said transport means for adjusting the incline of said track segments with respect to said cutting station.

13. The slicing machine according to claim 12, wherein the incline of said track element is adjusted about an axis which lies in the same line as a cutting edge of said cutting knives when said cutting knives are at an extreme end of said guide, closest to said track segments, and disposed in said recessed lateral groove.

* * * * *